US008481111B2

(12) United States Patent
Ziegler et al.

(10) Patent No.: US 8,481,111 B2
(45) Date of Patent: Jul. 9, 2013

(54) BRIGHT COLOURED SURFACE LAYER

(75) Inventors: Goran Ziegler, Viken (SE); Kent Lindgren, Perstorp (SE)

(73) Assignee: Ceraloc Innovation Belgium BVBA, Brussels (BE)

( * ) Notice: Subject to any disclaimer, the term of this patent is extended or adjusted under 35 U.S.C. 154(b) by 0 days.

(21) Appl. No.: 12/976,329

(22) Filed: Dec. 22, 2010

(65) Prior Publication Data

US 2011/0177354 A1 Jul. 21, 2011

Related U.S. Application Data

(60) Provisional application No. 61/295,343, filed on Jan. 15, 2010.

(51) Int. Cl.
*B05D 1/12* (2006.01)
*B05D 1/36* (2006.01)
*B32B 21/02* (2006.01)
*B32B 21/14* (2006.01)

(52) U.S. Cl.
USPC ........... 427/202; 427/201; 427/203; 427/370; 428/336; 428/535

(58) Field of Classification Search
USPC .................................. 427/201, 202, 203, 370
See application file for complete search history.

(56) References Cited

U.S. PATENT DOCUMENTS

| | | | |
|---|---|---|---|
| 2,962,081 | A | 11/1960 | Dobry et al. |
| 3,032,820 | A | 5/1962 | Johnson |
| 3,135,643 | A | 6/1964 | Michl |
| 3,308,013 | A | 3/1967 | Bryant |
| 3,345,234 | A | 10/1967 | Jecker et al. |
| 3,426,730 | A | 2/1969 | Lawson et al. |
| 3,486,484 | A | 12/1969 | Bullough |
| 3,673,020 | A | 6/1972 | De Jaeger |
| 3,846,219 | A | 11/1974 | Kunz |
| 3,897,185 | A | 7/1975 | Beyer |
| 3,914,359 | A | 10/1975 | Bevan |
| 4,093,766 | A | 6/1978 | Scher et al. |
| 4,131,705 | A | 12/1978 | Kubinsky |
| 4,313,857 | A | 2/1982 | Blount |
| 4,337,290 | A | 6/1982 | Kelly et al. |
| 4,430,375 | A | 2/1984 | Scher et al. |
| 5,034,272 | A | 7/1991 | Lindgren et al. |
| 5,246,765 | A | 9/1993 | Lussi et al. |
| 5,258,216 | A | 11/1993 | von Bonin et al. |

(Continued)

FOREIGN PATENT DOCUMENTS

| | | |
|---|---|---|
| AU | 80284/75 | 6/1975 |
| CH | 298 894 | 8/1954 |

(Continued)

OTHER PUBLICATIONS

Jacobsson, U.S. Appl. No. 61/349,950, entitled "Production Method," filed May 31, 2010.

(Continued)

*Primary Examiner* — Frederick Parker
(74) *Attorney, Agent, or Firm* — Buchanan Ingersoll & Rooney P.C.

(57) ABSTRACT

A method to produce a pale and/or plain colored wear resistant surface layer by using a dry powder layer comprising a mix of refined fibers binder, pigment and wear resistant particles.

37 Claims, 1 Drawing Sheet

U.S. PATENT DOCUMENTS

| | | | |
|---|---|---|---|
| 5,422,170 | A | 6/1995 | Iwata et al. |
| 5,543,193 | A | 8/1996 | Tesch |
| 5,569,424 | A | 10/1996 | Amour |
| 5,601,930 | A | 2/1997 | Mehta et al. |
| 5,604,025 | A | 2/1997 | Tesch |
| 5,855,832 | A | 1/1999 | Clausi |
| 5,925,296 | A | 7/1999 | Leese |
| 5,942,072 | A | 8/1999 | McKinnon |
| 6,103,377 | A | 8/2000 | Clausi |
| 6,468,645 | B1 | 10/2002 | Clausi |
| 6,773,799 | B1 | 8/2004 | Persson et al. |
| 6,803,110 | B2 | 10/2004 | Drees et al. |
| 7,022,756 | B2 | 4/2006 | Singer |
| 7,811,489 | B2 | 10/2010 | Pervan et al. |
| 2001/0009309 | A1 | 7/2001 | Taguchi et al. |
| 2002/0100231 | A1 | 8/2002 | Miller et al. |
| 2003/0056873 | A1 | 3/2003 | Nakos et al. |
| 2004/0191547 | A1 | 9/2004 | Oldorff |
| 2004/0202857 | A1 | 10/2004 | Singer |
| 2004/0206036 | A1 | 10/2004 | Pervan |
| 2004/0237436 | A1 | 12/2004 | Zuber et al. |
| 2005/0079780 | A1* | 4/2005 | Rowe et al. .................... 442/33 |
| 2005/0252130 | A1 | 11/2005 | Martensson |
| 2006/0024465 | A1 | 2/2006 | Briere |
| 2006/0032175 | A1 | 2/2006 | Chen et al. |
| 2006/0070321 | A1 | 4/2006 | Au |
| 2006/0145384 | A1 | 7/2006 | Singer |
| 2006/0183853 | A1 | 8/2006 | Sczepan |
| 2007/0166516 | A1 | 7/2007 | Kim et al. |
| 2007/0184244 | A1 | 8/2007 | Doehring |
| 2007/0207296 | A1 | 9/2007 | Eisermann |
| 2007/0218260 | A1 | 9/2007 | Miclo et al. |
| 2007/0224438 | A1 | 9/2007 | Van Benthem et al. |
| 2008/0000417 | A1 | 1/2008 | Pervan et al. |
| 2008/0032120 | A1 | 2/2008 | Braun |
| 2008/0090032 | A1 | 4/2008 | Perrin et al. |
| 2008/0263985 | A1 | 10/2008 | Hasch et al. |
| 2009/0124704 | A1 | 5/2009 | Jenkins |
| 2009/0155612 | A1* | 6/2009 | Pervan et al. ................ 428/498 |
| 2009/0208646 | A1 | 8/2009 | Kreuder et al. |
| 2010/0092731 | A1 | 4/2010 | Pervan et al. |
| 2010/0223881 | A1 | 9/2010 | Kalwa |
| 2010/0291397 | A1 | 11/2010 | Pervan et al. |
| 2010/0300030 | A1 | 12/2010 | Pervan et al. |
| 2010/0319282 | A1 | 12/2010 | Ruland |
| 2010/0323187 | A1 | 12/2010 | Kalwa |
| 2010/0330376 | A1 | 12/2010 | Trksak |
| 2011/0175251 | A1 | 7/2011 | Ziegler et al. |
| 2011/0177319 | A1 | 7/2011 | Ziegler et al. |
| 2011/0189448 | A1 | 8/2011 | Lindgren et al. |
| 2011/0247748 | A1 | 10/2011 | Pervan et al. |
| 2011/0250404 | A1 | 10/2011 | Pervan et al. |
| 2011/0293823 | A1 | 12/2011 | Bruderer et al. |
| 2011/0293906 | A1 | 12/2011 | Jacobsson |

FOREIGN PATENT DOCUMENTS

| | | | |
|---|---|---|---|
| DE | 1 815 312 | A1 | 7/1969 |
| DE | 7148789 | | 4/1972 |
| DE | 7148789 | U | 4/1972 |
| DE | 29 39 828 | A1 | 4/1981 |
| DE | 33 34 921 | A1 | 4/1985 |
| DE | 42 36 266 | A1 | 5/1993 |
| DE | 202 14 532 | U1 | 2/2004 |
| DE | 103 31 657 | A1 | 2/2005 |
| DE | 20 2004 003 061 | U1 | 7/2005 |
| DE | 20 2006 007 797 | U1 | 8/2006 |
| DE | 10 2005 046 264 | A1 | 4/2007 |
| DE | 10 2006 024 593 | A1 | 12/2007 |
| EP | 0 129 430 | A2 | 12/1984 |
| EP | 0 129 430 | B1 | 1/1990 |
| EP | 0 355 829 | A2 | 2/1990 |
| EP | 0 592 013 | A2 | 4/1994 |
| EP | 0 611 408 | B1 | 9/1996 |
| EP | 0 744 477 | A2 | 11/1996 |
| EP | 0 914 914 | A2 | 5/1999 |
| EP | 0 744 477 | B1 | 1/2000 |
| EP | 1 193 288 | A1 | 4/2002 |
| EP | 1 209 199 | A1 | 5/2002 |
| EP | 1 249 322 | A1 | 10/2002 |
| EP | 1 454 763 | A2 | 9/2004 |
| EP | 1 498 241 | A2 | 1/2005 |
| EP | 1 507 664 | A1 | 2/2005 |
| EP | 1 507 664 | B1 | 2/2005 |
| EP | 1 584 378 | A1 | 10/2005 |
| EP | 1 681 103 | A2 | 7/2006 |
| EP | 1 690 603 | A1 | 8/2006 |
| EP | 1 847 385 | A1 | 10/2007 |
| EP | 1 985 464 | A1 | 10/2008 |
| EP | 1 997 623 | A1 | 12/2008 |
| EP | 2 025 484 | A1 | 2/2009 |
| EP | 1 454 763 | B1 | 8/2009 |
| EP | 2 226 201 | A1 | 9/2010 |
| EP | 2 246 500 | A2 | 11/2010 |
| EP | 2 264 259 | A2 | 12/2010 |
| EP | 2 272 667 | A1 | 1/2011 |
| EP | 2 272 668 | A1 | 1/2011 |
| EP | 2 305 462 | A1 | 4/2011 |
| EP | 1 847 385 | B1 | 9/2011 |
| FR | 2 873 953 | A1 | 2/2006 |
| GB | 984 170 | A | 2/1965 |
| GB | 1090450 | | 11/1967 |
| JP | 2-229002 | A | 9/1990 |
| JP | 11-291203 | A | 10/1999 |
| JP | 2001-287208 | A | 10/2001 |
| JP | 2003-311717 | A | 11/2003 |
| JP | 2003-311718 | A | 11/2003 |
| JP | 2005-034815 | A | 2/2005 |
| JP | 2005-074682 | A | 3/2005 |
| JP | 2005-170016 | A | 6/2005 |
| JP | 2005-219215 | A | 8/2005 |
| JP | 3705482 | B2 | 10/2005 |
| JP | 2005-307582 | A | 11/2005 |
| JP | 2007-216692 | A | 8/2007 |
| JP | 2007-268843 | A | 10/2007 |
| JP | 2008-188826 | A | 8/2008 |
| SE | 469 326 | B | 6/1993 |
| WO | WO 92/06832 | A1 | 4/1992 |
| WO | WO 94/00280 | A1 | 1/1994 |
| WO | WO 95/06568 | A1 | 3/1995 |
| WO | WO 00/22225 | A1 | 4/2000 |
| WO | WO 01/48333 | A1 | 7/2001 |
| WO | WO 01/64408 | A1 | 9/2001 |
| WO | WO 01/92037 | A2 | 12/2001 |
| WO | WO 02/42167 | A2 | 5/2002 |
| WO | WO 03/078761 | A1 | 9/2003 |
| WO | WO 03/095202 | A1 | 11/2003 |
| WO | WO 2004/042168 | A1 | 5/2004 |
| WO | WO 2005/054600 | A1 | 6/2005 |
| WO | WO 2006/007413 | A1 | 1/2006 |
| WO | WO 2006/013469 | A1 | 2/2006 |
| WO | WO 2006/043893 | A1 | 4/2006 |
| WO | WO 2009/065768 | A1 | 5/2009 |
| WO | WO 2009/065769 | A2 | 5/2009 |
| WO | WO 2009/124704 | A1 | 10/2009 |
| WO | WO 2010/094500 | A1 | 8/2010 |

OTHER PUBLICATIONS

Ziegler, Göran,et al., U.S. Appl. No. 61/474,485, entitled "Pre Treated Powder," filed Apr. 12, 2011.

Håkansson, Niclas, et al., U.S. Appl. No. 61/474,498, entitled "Powder Based Balancing Layer," filed Apr. 12, 2011.

Ziegler, Goran et al. U.S. Appl. No. 12/976,213, entitled "Heat and Pressure Generated Design," filed Dec. 22, 2010.

Ziegler, Goran et al. U.S. Appl. No. 12/976,350, entitled "Fibre Based Panels with a Decorative Wear Resistance Surface," filed Dec. 22, 2010.

Lindgren, Kent et al. U.S. Appl. No. 12/976,478, entitled "Fibre Based Panels with a Decorative Wear Resistance Surface," filed Dec. 22, 2010.

Pervan, Darko, et al., U.S. Appl. No. 13/084,955, entitled "Powder Overlay," filed Apr. 12, 2011.

U.S. Appl. No. 61/349,950, Jacobsson.

U.S. Appl. No. 61/474,485, Ziegler et al.

U.S. Appl. No. 61/474,498, Håkansson et al.

U.S. Appl. No. 12/976,213, Ziegler et al.
U.S. Appl. No. 12/976,350, Ziegler et al.
U.S. Appl. No. 12/976,478, Lindgren et al.
U.S. Appl. No. 13/084,955, Pervan et al.
U.S. Appl. No. 13/084,974, Pervan et al.
Pervan, Darko, et al., U.S. Appl. No. 13/084,974, entitled "Digitally Injected Designs in Powder Surfaces," filed Apr. 12, 2011.
U.S. Appl. No. 61/485,930, Persson et al.
U.S. Appl. No. 61/557,643, Persson et al.
U.S. Appl. No. 61/557,734, Håkansson et al.
Persson, Hans, et al., U.S. Appl. No. 61/485,930, entitled "Scattering," filed May 13, 2011.
Persson, Hans, et al., U.S. Appl. No. 61/557,643, entitled "Scattering", filed Nov. 9, 2011.
Håkansson, Niclas, et al., U.S. Appl. No. 61/557,734, entitled "Powder Based Balancing Layer" filed Nov. 9, 2011.
International Search Report issued in PCT/SE2010/051472, Apr. 11, 2011, 6 pp., Swedish Patent Office, Stockholm, SE.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
Ziegler, Göran, et al., U.S. Appl. No. 13/444,604, entitled "A Powder Mix and Method for Producing a Building Panel," filed Apr. 11, 2012.
Persson, Hans, et al., U.S. Appl. No. 13/444,653, entitled "Powder Based Balancing Layer," filed Apr. 11, 2012.
Ziegler, Göran, et al, U.S. Appl. No. 13/445,379, entitled "Method of Manufacturing a Layer," filed Apr. 12, 2012.
Persson, Hans, et al., U.S. Appl. No. 13/469,799, entitled "Method of Producing a Powder Layer or a Granular Layer," filed May 11, 2012.
Vetter, Georg, et al., U.S. Appl. No. 61/612,672, entitled "Method for Producing a Building Panel," filed Mar. 19, 2012.
U.S. Appl. No. 13/444,604, Ziegler et al.
U.S. Appl. No. 13/444,653, Håkansson et al.
U.S. Appl. No. 13/445,379, Ziegler et al.
U.S. Appl. No. 13/469,799, Persson et al.
U.S. Appl. No. 61/612,672, Vetter, et al.
Pervan, Darko, et al., U.S. Appl. No. 13/693,979, entitled "Recycling of Laminate Floorings," filed Dec. 4, 2012.
Ziegler, Göran, et al., U.S. Appl. No. 13/705,310, entitled "Fibre Based Panels with a Decorative Wear Resistance Surface," filed Dec. 5, 2012.
U.S. Appl. No. 13/693,979, Pervan, et al.
U.S. Appl. No. 13/705,310, Ziegler, et al.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Pervan, Darko, et al., U.S. Appl. No. 13/793,971, entitled "Wood Fibre Based Panels with a Thin Surface Layer," filed in the U.S. Patent and Trademark Office on Mar. 11, 2013.
Vetter, Georg, et al., U.S. Appl. No. 13/804,355, entitled "Method for Producing a Building Panel," filed in the U.S. Patent and Trademark Office on Mar. 14, 2013.

* cited by examiner

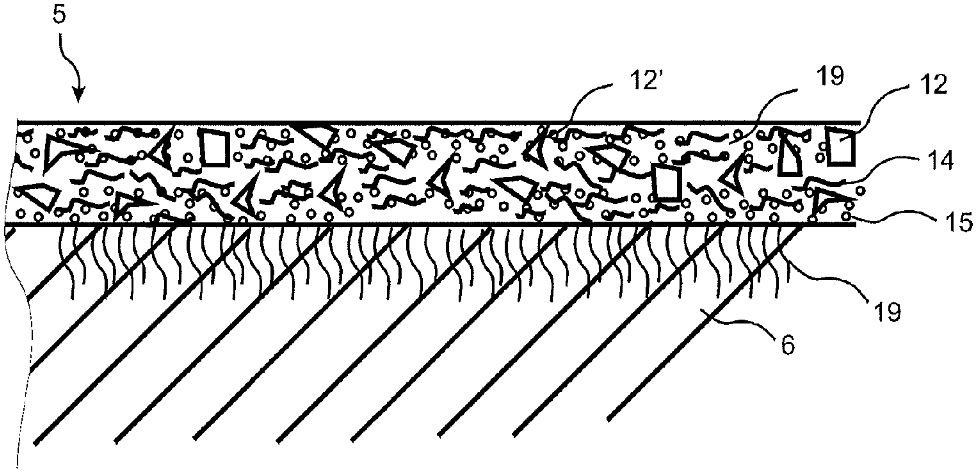
5
12'
19
12
14
15
19
6

BRIGHT COLOURED SURFACE LAYER

CROSS REFERENCE TO RELATED APPLICATIONS

The present application claims the benefit of U.S. Provisional Application No. 61/295,343, filed on Jan. 15, 2010, and claims the benefit of Swedish Application No. 1050037-9, filed on Jan. 15, 2010. The entire contents of each of U.S. Provisional Application No. 61/295,343 and Swedish Application No. 1050037-9 are hereby incorporated herein by reference.

TECHNICAL FIELD

The disclosure generally relates to the field of fibre-based panels with wear resistant surface layers for building panels, preferably floor panels. The disclosure relates to building panels with such wear resistance surface and to production methods to produce such panels.

FIELD OF APPLICATION

The present disclosure is particularly suitable for use in floating floors, which are formed of floor panels with a wood fibre core and a decorative wear resistant surface. The following description of technique, problems of known systems and objects and features of the invention will therefore, as a non-restrictive example, be aimed above all at this field of application and in particular at floorings which are similar to traditional floating wood fibre based laminate floorings. The disclosure does not exclude floors that are glued down to a sub floor.

It should be emphasized that embodiments of the disclosure can be used as a panel or as a surface layer, which is for example glued to a core. Embodiments of the disclosure can also be used in applications as for example wall panels, ceilings, and furniture components and similar. Embodiments could also be used in floorings with optional surface materials such as cork or wood, in order to improve wear and design properties

BACKGROUND

It is well known to produce laminated building panels with a surface comprising laminated paper sheets.

A new type of panel called Wood Fiber Floor (WFF) is disclosed in WO 2009/065769 which shows both products and methods to produce such a product.

Direct pressed laminated building panels usually comprises a core of a 6-12 mm fibre board, a 0.2 mm thick upper decorative surface layer of laminate and a 0.1-0.2 mm thick lower balancing layer of laminate, plastic, paper or like material.

A laminated surface generally comprise two paper sheets, a 0.1 mm thick printed decorative paper and a transparent 0.05-0.1 mm thick overlay paper applied over the decorative paper and intended to protect the decorative paper from abrasion. The print on the decorative non-transparent paper is only some 0.01 mm thick. The transparent overlay, which is made of refined α-cellulose fibres, comprises small hard and transparent aluminium oxide particles. The refined fibres are rather long, about 2-5 mm and this gives the overlay paper the required strength. In order to obtain the transparency, all natural resins that are present in the virgin wood fibres, have been removed and the aluminium oxide particles are applied as a very thin layer over the decorative paper. The surface layer of a laminate floor is characterized in that the decorative and wear resistance properties are generally obtained with two separate layers one over the other.

The printed decorative paper and the overlay are impregnated with melamine resin and laminated to a wood fibre based core under heat and pressure.

The small aluminium oxide particles could have a size in the range of 20-100 microns. The particles could be incorporated in the surface layer in several ways. For example they could be incorporated in the pulp during the manufacturing of the overlay paper. They could also be sprinkled on the wet lacquer during impregnation procedure of the overlay or incorporated in the lacquer used for impregnation of the overlay.

The wear layer could also be produced without a cellulose overlay. In such a case melamine resin and aluminium oxide particles are applied as a lacquered layer directly on the decorative paper with similar methods as described above. Such a wear layer is generally referred to as liquid overlay.

With this production method a very wear resistance surface could be obtained and this type of surface is mainly used in laminate floorings but it could also be used in furniture components and similar applications. High quality laminate floorings have a wear resistance of 4000-6000 revolutions, which corresponds to the abrasion classes AC4 and AC5 measured with a Taber Abraser according to ISO-standard.

It is also known that the wear resistance of a lacquered wood surface could be improved considerably by incorporating aluminium oxide particles in the transparent lacquer covering the wood surface.

The most common core material used in laminate floorings is fibreboard with high density and good stability usually called HDF—High Density Fibreboard. Sometimes also MDF—Medium Density Fibreboard—is used as core. Other core materials such as particleboard are also used.

The WFF floor panels are "paper free" with a surface layer comprising a substantially homogenous mix of wood fibres, binders and wear resistant particles. The wear resistant particles are preferably aluminium oxide particles and the binders are preferably thermosetting resins such as melamine. The wear resistant particles are provided throughout the thickness of the surface layer from the top to the bottom and in contact with the core of the panel. Other suitable materials are for example silica or silicon carbide. In general all these materials are preferably applied in dry form as a mixed powder on a HDF core and cured under heat and pressure to a 0.2-1.0 mm surface layer.

DEFINITION OF SOME TERMS

In the following text, the visible surface of the installed floor panel is called "front side", while the opposite side of the floor panel, facing the sub floor, is called "rear side". The sheet-shaped material that comprises the major part of a panel and provides the panel with the required stability is called "core". When the core is coated with a surface layer closest to the front side and preferably also a balancing layer closest to the rear side, it forms a semi-manufacture, which is called "floor board" or "floor element" in the case where the semi-manufacture, in a subsequent operation, is divided into a plurality of floor elements. When the floor elements are machined along their edges so as to obtain their final shape with the joint system, they are called "floor panels". By "surface layer" is meant all layers which give the panel its decorative properties and its wear resistance and which are applied to the core closest to the front side covering preferably the entire front side of the floorboard. By "decorative surface layer" is meant a layer, which is mainly intended to give the floor its decorative appearance. "Wear layer" relates to a layer, which is mainly adapted to improve the durability of the front side.

By "horizontal plane" is meant a plane, which extends parallel to the outer part of the surface layer. By "horizontally" is meant parallel to the horizontal plane and by "vertically" is meant perpendicularly to the horizontal plane. By "up" is meant towards the front side and by "down" towards the rear side.

SUMMARY OF THE INVENTION

An overall objective of embodiments of the disclosure is to provide a building panel, preferably a floor panel with a pale and/or plain colour, e.g. bright white, wear resistant layer that could be produced in a more cost effective way than with the present known technology.

The methods described in WO 2009/065769 include the use of virgin or recycled wood fibres that have the limitation that while using pigments intended to give pale colours, e.g. bright white colour, or very intense colours, the natural colour of the virgin or recycled wood fibre give a less pale or less colourful result due to the natural resins of the fibres. The natural resin makes it difficult to achieve the desired colour and might cause areas that are discoloured. The problems of limited colourfulness could be solved by increasing the amount of the pigments, but this is a rather expensive solution and high pigment loadings could cause other problems such a pigment bleed.

Conventional laminated floors panels have a limitation in making pale coloured or intensively coloured surfaces, due to the limited transparency of the highly wear resistant overlays.

A solution to the problems is to use a dry powder layer comprising a mix of refined fibres binder, pigment and wear resistant particles.

An aspect of the invention is a production method to produce a pale coloured wear resistant surface layer comprising the steps of:

- Applying a dry powder layer comprising a mix of refined fibres, binder, pigment and wear resistant particles on a carrier; and
- Curing the mix to a colourful or bright white wear resistant layer by applying heat and pressure on the mix.

The binder is preferably a melamine resin and the wear resistant particles aluminium oxide. The pigments for making bright white products are preferably titanium dioxide, lead oxide or other commonly used pigments. The pigments for making very colourful products are a broad variety of both inorganic and organic origin.

The carrier on which the mix is applied is preferably an HDF panel and the resulting panel thereby has wear resistant particles throughout the thickness of the surface layer from the top to the bottom and in contact with the core of the panel.

The refined fibres are fibres that are predominantly free from the natural resins typically found in wood fibres or other natural fibres. Such fibres can be achieved through washing, extraction, bleaching or combinations thereof. An example of such a fibre is Technocel® 150 TAB which can be provided by the company CFF (Germany).

In a preferred embodiment, the amount of resin compared to the amount of refined fibres, e.g., white fibres, in the dry powder layer is higher than about 100%, preferably above about 120% and most preferably in the range of about 120% to 180%. Such ratios have the effect that the processability is increased and that the stain resistance is improved.

A sublayer, a layer scattered on the core, in combination with the dry powder layer above the sublayer, gives even better processability such as embossing depth and higher gloss. In embodiments, the sublayer comprises wood fibres, preferably natural wood fibres or HDF fibres, though refined fibres may be used, and a resin. In a preferred embodiment, the amount of resin compared to the amount of wood fibres is less than about 100%, preferably below about 200%, more preferably below about 300%, and possibly even below about 400%.

A top layer of refined fibres, without any aluminium oxide, placed above the dry powder layer further improves the stain resistance. It also increases the lifetime of the press plates.

Embodiments of the disclosure include the following combination of layers: (1) a sublayer and a dry power layer; (2) a dry powder layer and a top layer; and (3) a sublayer a dry powder layer and a top layer.

It is also possible to use a mix of refined fibres and HDF fibres or any natural wood fibers, i.e., wood fibres that are not refined, in order to decrease the cost and or create other colours.

Many combinations of the ingredients can be made into fully functional products. Two examples are given as to show two functional prototypes of the innovation.

BRIEF DESCRIPTION OF THE DRAWINGS

The disclosure will in the following be described in connection to preferred embodiments and in greater detail with reference to the appended exemplary drawing, wherein FIG. 1 Illustrates a floor panel according to an embodiment of the disclosure.

DETAILED DESCRIPTION OF EMBODIMENTS

A panel 1 is provided with a wood fibre based core 6, a homogenous non-transparent decorative surface layer 5 and preferably a balancing layer. The panel 1 is in one embodiment integrally formed in a production process where the surface layer, the core and the balancing layer are formed in the same pressing operation.

FIG. 1 shows the surface layer 5. It comprises a mixture of refined fibres 14, small hard wear resistant particles 12, 12' and a binder 19. The wear resistant particles (12,12') are preferably aluminium oxide particles.

The surface layer comprises also colour pigments 15 and/or, optionally, other decorative materials or chemicals. Decorative materials include, for example, materials that may affect design aspect(s) the surface layer. Exemplary design materials include materials effecting texture, reflectivity, shine, luminescence, transparency, etc.

Embodiments of the disclosure offer the advantage that the wear resistant surface layer 5 could be made much thicker than in the known laminated floor panels.

A preferable binder is melamine or urea formaldehyde resin. Any other binder, preferably synthetic thermosetting resins, could be used.

In the method according to embodiments of the invention preferably the same scattering and pressing units as disclosed in WO 2009/065769 are used, preferably together with a structured press plate in the method.

Example W1

Bright White Formulation

On a HDF board with a thickness of 9.8 mm, two backing papers NKR 140 where fixed on backside for balancing, a WFF powder formulation was added, consisting of 40 Wt % refined fiber, 10 Wt % aluminium oxide, 10 Wt % titanium dioxide as pigment and 40 Wt % melamine resin. The WFF powder mix was applied by a so-called scattering machine, which distributed the WFF powder material evenly over the HDF surface. The total amount of WFF powder was 625 g/m$^2$. The WFF powder was fixed on the HDF board by spraying a water solution consisting of 97 Wt % de-ionized water, 1 Wt % BYK-345 (wetting agent added to reduce surface tension) and 2 Wt % of Pat 622/E (release agent) on the WFF powder.

The above material was placed into a so-called DPL press. The surface texture consists of a special press plate with hills and valleys with about 300 microns in difference in highest and lowest part. This deep press plate can not be used when pressing DPL and HPL, the melamine impregnated papers cracks during the pressing. The resulting product is a bright white building panel.

Further examples of powder mixtures are listed below.

| Type | W1 | W2 | W3 | W4 | Sublayer | W5 |
|---|---|---|---|---|---|---|
| HDF Fibre Wt % | 0 | 0 | 0 | 0 | 75 | 0 |
| White Fibre Wt % | 40 | 40 | 35 | 30 | 0 | 39 |
| Prefere 4865 Wt % | 0 | 40 | 45 | 52 | 25 | 0 |
| Kauramine 773 Wt % | 40 | 0 | 0 | 0 | 0 | 50 |
| TiO2 Wt % | 10 | 10 | 10 | 9 | 0 | 11 |
| Al2O3 Wt % | 10 | 10 | 10 | 9 | 0 | 0 |
| Total Wt % | 100 | 100 | 100 | 100 | 100 | 100 |

In the mixtures above Prefere 4865 and Kauramine 773 are used, which are examples of melamine formaldehyde resins For W3 and W4 the weight ratio of resin compared to the White Fibres (refined fibres) is increased. The increased ratio has the effect that the processability is increased and that the stain resistance is improved. In a preferred embodiment the weight ratio of resin compared to the White Fibres is higher than about 100%, preferably above about 120% and most preferably in the range of about 120% to 180%.

A sublayer, a layer scattered on the core, in combination with any one of the layers W1-W4 above the sublayer gives even better processability such as embossing depth and higher gloss.

A top layer, such as W5, without any aluminium oxide above any one of the layers W1-W4 further improves the stain resistance. It also increases the life time of the press plates.

Example R2

Colourful Red Formulation

On a HDF board with a thickness of 9.8 mm, two backing papers NKR 140 where fixed on backside for balancing, a WFF powder formulation was added, consisting of 42.5 Wt % refined fiber, 10 Wt % aluminium oxide, 5 Wt % Heucosin Spez. Tomatenrot G 10138 as red pigment and 42.5 Wt % melamine resin. The WFF powder mix was applied by a so-called scattering machine, which distributed the WFF powder material evenly over the HDF surface. The totally amount of WFF powder was 625 g/m$^2$. The WFF powder was fixed on the HDF board by spraying a water solution consisting of 97 Wt % de-ionized water, 1 Wt % BYK-345 (wetting agent added to reduce surface tension) and 2 Wt % of Pat 622/E (release agent) on the WFF powder.

The above material was placed into a so-called DPL press. The surface texture consists of a special press plate with hills and valleys with about 300 microns in difference in highest and lowest part. This deep press plate can not be used when pressing DPL and HPL, the melamine impregnated papers cracks during the pressing. The resulting product is a colorful plain red building panel not easily obtained without the refined fibre.

The water solution sprayed on the WFF powder may include, for example, 80-100 Wt % water, preferably de-ionized water, 0-10 Wt % of a wetting agent, and 0-10% of a release agent. More preferably, the water solution may include, for example, 95-98.5 Wt % water, preferably about 97 Wt %, 0.5-2 Wt % wetting agent, preferably about 1 Wt %, and 1-3 Wt % release agent, preferably about 2 Wt %.

The invention claimed is:

1. A method of manufacturing a wear resistant surface layer comprising the steps of:

applying a sublayer comprising a mix of wood fibres and a resin on a carrier;

applying a dry powder layer comprising a mix of refined fibres, binder, pigments and wear resistant particles on the sublayer, wherein the sublayer is arranged between the carrier and the dry powder layer; and curing the sublayer and the dry powder layer by applying heat and pressure on the layers, wherein the dry powder layer is cured to a wear resistant surface layer.

2. The method as claimed in claim 1, wherein the carrier is a wood fibre based core, and the wear resistant surface layer is attached to the wood fibre based core to obtain a panel, wherein the core comprises a major part of the panel.

3. The method as claimed in claim 2, wherein the panel is a floor panel.

4. The method as claimed in claim 1, wherein the wear resistant particles are aluminium oxide.

5. The method as claimed in claim 1, wherein the thickness of the wear resistant surface layer is less than about 1 mm.

6. The method as claimed in claim 1, wherein the wear resistant surface layer is white or red.

7. The method as claimed in claim 2, wherein the carrier is an HDF panel.

8. The method as claimed in claim 2, wherein the wear resistant particles are aluminium oxide.

9. The method as claimed in claim 2, wherein the thickness of the wear resistant surface layer is less than about 1 mm.

10. The method as claimed in claim 5, wherein the thickness of the wear resistant surface layer is less than about 0.3 mm.

11. The method as claimed in claim 2, wherein the thickness of the wear resistant surface layer is less than about 0.3 mm.

12. The method as claimed in claim 2, wherein the wear resistant surface layer is white or red.

13. The method as claimed in claim 2, wherein the binder is a resin and the weight ratio of resin compared to refined fibres is higher than about 100%.

14. The method as claimed in claim 2, wherein the binder is a resin and the weight ratio of resin compared to refined fibres is higher than about 120%.

15. The method as claimed in claim 2, wherein the binder is a resin and the weight ratio of resin compared to refined fibres is in the range of about 120% to about 180%.

16. The method as claimed in claim 2, wherein the step of applying the sublayer on the core comprises scattering the mix of wood fibres and resin on the core.

17. The method as claimed in claim 2, further comprising a step of scattering a top layer above the dry powder layer.

18. The method as claimed in claim 2, wherein a balancing layer is applied to a surface of the wood fibre based core that is opposite that sublayer and the wear resistant surface layer.

19. The method as claimed in claim 1, wherein the wood fibres in the sublayer layer are refined fibres.

20. The method as claimed in claim 1, wherein the wood fibres in the sublayer layer are HDF fibres.

21. A method of manufacturing a wear resistant surface layer comprising the steps of:

applying a dry powder layer comprising a mix of refined fibres, resin, pigments and wear resistant particles on a carrier, wherein the weight ratio of resin to refined fibres is higher than about 120%; and curing the dry powder layer to a wear resistant layer by applying heat and pressure on the dry powder layer.

22. The method as claimed in claim 21, wherein the carrier is a wood fibre based core, and the wear resistant surface layer is attached to the wood fibre based core to obtain a panel.

23. The method as claimed in claim 22, wherein the panel is a floor panel.

24. The method as claimed in claim 21, wherein the wear resistant particles are aluminium oxide.

25. The method as claimed in claim 21, wherein the thickness of the wear resistant surface layer is less than about 1 mm.

26. The method as claimed in claim 21, wherein the wear resistant surface layer is white or red.

27. The method as claimed in claim 22, wherein the carrier is an HDF panel.

28. The method as claimed in claim 22, wherein the wear resistant particles are aluminium oxide.

29. The method as claimed in claim 22, wherein the thickness of the wear resistant surface layer is less than about 1 mm.

30. The method as claimed in claim 25, wherein the thickness of the wear resistant surface layer is less than about 0.3 mm.

31. The method as claimed in claim 22, wherein the thickness of the wear resistant surface layer is less than about 0.3 mm.

32. The method as claimed in claim 22, wherein the wear resistant surface layer is white or red.

33. The method as claimed in claim 22, wherein the weight ratio of resin compared to refined fibres is in the range of about 120% to about 180%.

34. The method as claimed in claim 32, further comprising a step of scattering a sublayer on the wood fibre based core.

35. The method as claimed in claim 22, further comprising a step of scattering a top layer above the dry powder layer.

36. A floor panel produced by a method comprising:

applying a sublayer comprising a mix of wood fibres and a resin on a carrier, wherein the carrier is a wood fibre based core, and the wood fibre based core comprises a major part of the floor panel;

applying a dry powder layer comprising a mix of refined fibres, binder, pigments and wear resistant particles on the sublayer to form a wear resistant surface layer; and curing the sublayer and the dry powder layer by applying heat and pressure on the layers, wherein the dry powder layer is cured to a wear resistant surface layer.

37. A floor panel produced according to the method in claim 23.

* * * * *